United States Patent [19]

Yabuki et al.

[11] 4,164,114

[45] Aug. 14, 1979

[54] HIGH STRENGTH POLYESTER FIBROUS PRODUCTS

[75] Inventors: Kazuyuki Yabuki; Mitsuo Iwasaki, both of Otsu, Japan

[73] Assignee: Toyobo Petcord, Co., Ltd., Japan

[21] Appl. No.: 897,480

[22] Filed: Apr. 18, 1978

[30] Foreign Application Priority Data

Apr. 18, 1977 [JP] Japan .............................. 52/44824

[51] Int. Cl.² ............................................ D02G 3/48
[52] U.S. Cl. ...................................... 57/236; 57/243; 57/902; 528/308
[58] Field of Search ........... 57/140 R, 140 BY, 157 S, 57/157 R; 260/78 R, 75 R, 78 S, 857 PE, 75 TN; 264/290 T; 152/359

[56] References Cited

U.S. PATENT DOCUMENTS

| | | | |
|---|---|---|---|
| 3,216,187 | 11/1965 | Chantry et al. | 57/140 R X |
| 3,429,117 | 2/1969 | Sherer | 57/140 BY |
| 3,564,835 | 2/1971 | Keefe, Jr. et al. | 57/140 R |
| 3,854,515 | 12/1974 | Takemura et al. | 152/359 X |
| 3,869,427 | 3/1975 | Meschke et al. | 260/75 R X |
| 3,869,430 | 3/1975 | Blades | 260/78 S |
| 3,929,180 | 12/1975 | Kawase et al. | 152/359 |
| 3,977,172 | 8/1976 | Kerawalla | 57/140 BY |

*Primary Examiner*—John Petrakes
*Attorney, Agent, or Firm*—Jones, Tullar & Cooper

[57] ABSTRACT

A high strength polyester fibrous product reduced in heat build-up and improved in durability and useful for reinforcing rubber materials, which can be prepared by twisting drawn yarns obtained by (1) melt spinning a polymeric composition comprising polyethylene terephthalate as the main polymer component and at least one methylene group-containing polyester in such an amount that the proportion of the total number of methylene groups to the total number of terephthalic acid residues in all the polymer components is more than 2.0 and less than 2.5, the polyester having a glass transition temperature lower than that of the polyethylene terephthalate and being selected from the group consisting of (i) polyalkylene terephthalates wherein the alkylene unit is a straight chain having 3 to 8 carbon atoms, (ii) polyalkylene isophthalates wherein the alkylene unit is a straight chain having 2 to 6 carbon atoms and (iii) aliphatic polyesters wherein the number of the methylene groups between two ester linkages is from 2 to 10, and (2) drawing the resulting as spun yarns, and having the following melting point (Tm):

$$\text{Tm pet} \geq \text{Tm} \geq \text{Tm pet} - 10^\circ \text{ C.}$$

(wherein Tm pet is the melting point of the polyethylene terephthalate) and the following peak temperature (Tα) of the main absorption appearing in the temperature distribution of the mechanical loss tangent when heat treated in the air at 240° C. for 2 minutes while keeping a constant length after the drawing:

$$\text{T}\alpha \text{ pet} - 2^\circ \text{ C.} \geq \text{T}\alpha \geq \text{T}\alpha \text{ pet} - 20^\circ \text{ C.}$$

(wherein Tα pet is the peak temperature of the main absorption of the yarns made of polyethylene terephthalate alone drawn and heat treated under the same conditions as applied to the said as spun yarns made of the polymeric composition).

12 Claims, No Drawings

HIGH STRENGTH POLYESTER FIBROUS PRODUCTS

The present invention relates to high strength polyester fibrous products and their production. More particularly, it relates to high strength polyester fibrous products having a reduced heat build-up and an improved durability and being useful for reinforcement of rubber materials.

High strength polyester fibrous products, whose typical examples are polyester tire cords, possess the merits of both rayon and nylon and are thus useful as fiber for rubber-reinforcement having the best balanced properties. In recent years, they occupy an indisputable position as carcass materials for passenger car tires. However, their durability and adhesive property are not yet sufficient, so that, for reinforcement of tires to be exposed to higher temperatures such as truck tires and bus tires, their use is limited to a much narrower range.

For the purpose of improving the durability of polyester fibers, there has hitherto been employed a method which comprises blocking the carboxyl end groups so as to increase the hydrolysis-resistance and/or the amine decomposition-resistance. For improvement of the adhesive properties, a compound having an affinity to the polyester (e.g. isocyanate compound, epoxy compound, imine compound) has been incorporated as an auxiliary adhesion agent.

However, polyester produces a large amount of heat in comparison with hylon, when used as a rubber-reinforcing fiber (cf. J. Zimmerman: Textile Manufacturer, February, pp. 49-51 (1974)), and this demerit can not be overcome satisfactorily by the improving methods mentioned above. Because of this high heat build-up of polyester in rubber, when truck and bus tires which are inevitably used under a condition of extremely high temperatures contain such polyester as a rubber-reinforcing material, this readily causes fatigue, deterioration and reduction of adhesion. Therefore, a fundamental improvement of reduction of the heat build-up of the polyester is necessary for overcoming the said two demerits of the polyester as mentioned above.

As the result of extensive study, it has been found that, when the restraining force of the molecular chain of the amorphous parts of the polyester fiber (Ha) is defined by the following equation: $Ha = T\alpha^2/W$ (wherein $T\alpha$ is the temperature of the main absorption peak of the mechanical loss tangent-temperature curve (°K), and W is the half width of the peak (°K)), the amount of heat produced by the polyester fiber and Ha are in a directly proportional relationship in case of using the polyester fiber as a rubber-reinforcing material, especially as a tire cord, so that it is necessary to reduce the restraining force of the molecular chain of the amorphous parts for lowering the heat build-up of the polyester fiber.

Reduction of the restraining force of the molecular chain of the amorphous parts can be attained by various methods, e.g. by lowering the intrinsic viscosity of the fiber, diminishing the draw ratio or elevating the temperature in the heat treatment. However, lowering of the intrinsic viscosity of the fiber results in reduction of the strength and also in loss of the durability against fatigue with buckling deformation. By diminution of the draw ratio, mechanical properties required as tire cords, e.g. the strength and the elongation, are markedly deteriorated. With respect to the temperature applied in the heat treatment, in actual practice, in order to attain sufficient adhesion between the rubber and the fiber, temperatures of such height is applied when administering the adhesive process as would delete or reduce the strength of the fiber to some extent. This means that additional elevation of the temperature would cause marked deterioration of the fiber.

Thus, it is impossible, by the above-mentioned methods, to attain decrease of the restraining force of the molecular chain of the amorphous parts and, as the result, reduction of the heat build-up, without deteriorating the excellent properties of the polyester fiber.

In polyester fiber, especially in the polyethylene terephthalate fiber, the advantageous properties are greatly dependent on the terephthalic acid residue in the molecular chain. For example, the high initial modulus which is the primary cause for the indisputable position of the polyester in the field of clothing is derived from the rigidity of the molecular chain in the presence of the terephthalic acid residue. The excellent dimensional stability as tire cord is also attributable greatly to the rigidity of the molecular chain. However, in respect to the heat build-up which comes into question when using polyester fiber as a rubber-reinforcing material such as tire cord, this rigidity of the molecular chain is considered as an undesirable property, from the viewpoint that the restraining force of the molecular chain of the amorphous parts should be decreased. It is therefore reasonable to incorporate a modifier which decreases the rigidity of the molecular chain of polyethylene terephthalate for reducing the heat build-up of the polyester tire cord. As such modifier, the use of a polyester capable of being copolymerized by an ester exchange reaction is desirable for enhancing the modifying effect.

On the basis of the findings and considerations as mentioned above, further investigation has been made on the polyester fibrous products for rubber-reinforcement for attaining reduction of their heat build-up in rubber and improvement of their durability without deteriorating their excellent properties and, as the result, succeeded in obtaining high strength polyester fibrous products for rubber-reinforcement which serve the said purpose.

According to the present invention, a high strength polyester fibrous product in heat build-up and improved in durability and useful for reinforcing rubber materials can be produced by twisting drawn yarns obtained by (1) melt spinning a polymeric composition comprising polyethylene terephthalate as the main polymer component and at least one methylene group-containing polyester in such an amount that the proportion of the total number of methylene groups to the total number of terephthalic acid residues in all the polymer components is more than 2.0 and less than 2.5, preferably with at least one compound capable of blocking the carboxyl end groups in the polyethylene terephthalate and the polyester in such an amount that the carboxyl equivalent in all the polymer components is not more than 15 eq/10$^6$ g, the polyester having a glass transition temperature lower than that of the polyethylene terephthalate and being selected from the group consisting of (i) polyalkylene terephthalates wherein the alkylene unit is a straight chain having 3 to 8 carbon atoms, (ii) polyalkylene isophthalates wherein the alkylene unit is a straight chain having 2 to 6 carbon atoms and (iii) aliphatic polyesters wherein the number of the methylene groups between two ester linkages is from 2 to 10,
and (2) drawing the resulting as spun yarns, and having the following melting point (Tm):

$$Tm\ pet \geqq Tm \geqq Tm\ pet - 10° C.$$

(wherein Tm pet is the melting point of the polyethylene terephthalate) and the following peak temperature (Ta) of the main absorption appearing in the temperature distribution of the mechanical loss tangent when heat treated in the air at 240° C. for 2 minutes while keeping a constant length after the drawing:

$$T\alpha pet - 2° C. \geqq T\alpha \geqq T\alpha\ pet - 20° C.$$

(wherein Ta pet is the peak temperature of the main absorption of the yarns made of polyethylene terephthalate alone drawn and heat treated under the same conditions as applied to the said as spun yarns made of the polymeric composition).

The polyethylene terephthalate may contain some quantity of copolymerization units, but the one composed of 100% of ethylene terephthalate unit is favorable in respect to the high melting point, the thermal resistance, etc. Its intrinsic viscosity (determined in a solvent mixture of phenol/tetrachloroethane (3:2 by weight) at 30° C.) is desired to be 0.6 or more, particularly 0.7 or more for obtaining a high strength. There is no particular limitation as to the process for production of the polyethylene terephthalate itself, and it may be prepared, for instance, by polycondensation of terephthalic acid or its functional derivative with ethylene glycol or ethylene oxide by a conventional procedure. The polyethylene terephthalate is favorably subjected, in a pellet form, to solid state polymerization so as to obtain a high degree of polymerization.

Specific examples of each of the said polyesters (i), (ii) and (iii) are as follows:

(i) Polytrimethylene terephthalate, polytetramethylene terephthalate, polyhexamethylene terephthalate, polyoctamethylene terephthalate, etc.;

(ii) Polyethylene isophthalate, polytetramethylene isophthalate, polyhexamethylene isophthalate, etc.;

(iii) Polyethylene succinate, polyethylene adipate, polyethylene sebacate, polytetramethylene succinate, polycaprolactone, etc.

The polyesters to be incorporated are not necessarily limited to homopolyesters as exemplified above, but copolyesters comprising the monomeric units constituting such homopolyesters may be also employed. Further, two kinds or more of them may be incorporated. The production process for these polyesters is also not particularly limited, but a conventional procedure comprising the polycondensation reaction between a corresponding dicarboxylic acid and a diol may be preferably adopted. When the glass transition point of the polyethylene terephthalate is 73° C., the glass transition points of some typical polyesters which can be preferably used in the present invention (determined as hereinbelow mentioned) are as follows:

|  | Glass transition point (°C.) |
|---|---|
| Polytetramethylene terephthalate | 25 |
| Polyethylene isophthalate | 51 |
| Polyethylene succinate | −1 |

-continued

|  | Glass transition point (°C.) |
|---|---|
| Polyethylene sebacate | −30 |

These polyesters enter into the amorphous parts of the polyethylene terephthalate, being combined or not with the molecule of the polyethylene terephthalate, and play a roll of reducing the restraining power of the molecular chain of the amorphous parts. The most preferable polyester to be used in the invention is polytetramethylene terephthalate, and then follows polyethylene isophthalate. In case of aliphatic polyesters, the one having a higher melting point is desirable.

The addition of the polyester to the polyethylene terephthalate may be effected, for example, by the following procedures: (1) adding to the polyethylene terephthalate in a melted state at the final stage of polymerization, (2) continuously adding under measured control in the course of supply of the polyethylene terephthalate before spinning, (3) previously adding in a pellet form, etc. In the present invention, the procedure (2) or (3) is preferably adopted. In case of the procedure (1), random copolymerization between the polyethylene terephthalate and the added polyester may rapidly progress and the effect to be expected in the present invention may not be obtained sufficiently.

The amount of the polyester to be added is such that the proportion of the total methylene groups to the total terephthalic acid residues in all the polymer components is in a range of more than 2.0 and less than 2.5. In case of adding polytetramethylene terephthalate to the polyethylene terephthalate, the proportion of the methylene groups to the terephthalic acid residues (M/T) is 2.0 in polyethylene terephthalate and 4.0 in polytetramethylene terephthalate, so that the amount of polytetramethylene terephthalate to be added (mol %) should be more than 0 but less than 25 mol % in order to satisfy the condition: 2.0<M/T<2.5. In case of adding polyethylene isophthalate, the amount to be added is more than 0 but less than 20 mol %.

The polyester fibrous product to be used as a rubber-reinforcing material is necessarily subjected to high temperature treatments at the subsequent steps such as treatment with an adhesive agent and vulcanization. It is therefore important to inhibit as much as possible lowering of the melting temperature due to the addition of the polyester having a low glass transition point. From this point of view, the melting point (Tm; °C.) of the polyester fibrous product of the invention is required to satisfy the following condition:

$$Tm\ pet \geqq Tm \geqq Tm\ pet - 10° C.$$

(wherein Tm pet is the melting point of the polyethylene terephthalate). In case of Tm<Tm pet−10° C., undisregardable deterioration of the mechanical properties of the polyester fibrous product is caused by the high temperature treatment as mentioned above, so that sufficient effect as rubber-reinforcing material is not expected. It is particularly preferable in the present invention that the said melting temperature (Tm) satisfies the following condition:

$$Tm\ pet \geqq Tm \geqq Tm\ pet - 5° C.$$

For inhibiting the lowering of the melting point as much as possible, random copolymerization should be avoided, and block copolymerization of high extent is desirable.

$T\alpha$ is an important factor in the present invention, since it can be employed, in place of $H\alpha$, as the measure for the restraining force of the molecular chain of the amorphous parts of the polyester fibrous product. $T\alpha$ is defined by the following inequality:

$$T\alpha \text{ pet} - 2° C. \leq T\alpha \leq T\alpha \text{ pet} - 20° C.$$

When the decrease of $T\alpha$ to $T\alpha$ pet is smaller than 2° C., any marked improvement of the heat build-up is not observed. When it exceeds 20° C., the desirable property as a rubber-reinforcing material, i.e. the high thermal deformation temperature which is a merit inherent to polyethylene terephthalate is lost. Preferably, $T\alpha$ is desired to satisfy the following condition:

$$T\alpha \text{ pet} - 5° C. \geq T\alpha \geq T\alpha \text{ pet} - 15° C.$$

Since the polyester fibrous product of the invention is used for reinforcement of rubber materials, the filament denier obtained by drawing and heat treatment by conventional procedures is desired to be 3 or more, preferably 4 or more, and the yarn denier is 500 d or more, preferably 800 d or more. Twisting is necessary for giving compression-resistant properties to the yarn as a rubber-reinforcing material. It is desirable to twist two or three (or more) yarns to make a cord. The number of twists (in case of cord, number of ply twist and number of cable twist) is decided so that the twisting constant K, defined by the following equation, is in the range of 500 to 2500:

$$K = TW \times \sqrt{D}$$

(wherein TW is the number of twist per 10 cm and D is a yarn denier).

After twisting, the twisted yarns or the twisted cord is subjected to weaving process and then treatment with a conventional adhesive agent for polyester fiber, i.e. with a solution mixture of RFL (resorcine formalin latex) and Pexul (adhesion-auxiliary agent) manufactured by ICI), or with a solution of an epoxy compound and then RFL, and the thus treated product is employed as a rubber-reinforcing material.

The carboxyl end group of the polyester has an undesirable influence to the hydrolysis-resistance and the amine decomposition-resistance of the obtained fiber. When the polyester having a low glass transition temperature is added to the polyethylene terephthalate, the amount of the carboxyl groups tends to be increased. Therefore, a carboxyl end group-blocking agent is preferably incorporated for inhibiting such increase of the amount of the carboxyl group to obtain a fiber having an excellent durability and being more stable chemically. By the incorporation of such blocking agent, the amount of the carboxyl groups in the obtained fiber polymer is regulated to 15 equivalent/$10^6$ g or less. Specific examples of such blocking agent are as follows:

(1) Isocyanates or isocyanate-generating substances such as blocked isocyanates and polyurethane (cf. U.S. Pat. No. 3,563,849) (e.g. polyurethanes obtained from diisocyanates such as tolylene diisocyanate and 4,4'-methylenebis(phenylisocyanate) and glycols such as ethylene glycol and tetramethylene glycol or dicarboxylic acids such as adipic acid and sebacic acid);

(2) Carbodiimides such as dicyclohexylcarbodiimide, di-p-toluoylcarbodiimide and di-o-tolycarbodiimide;

(3) Epoxy compounds such as phenylglycidyl ether and o-tolyl glycidyl ether;

(4) Isocyanurates, ethylene imines, etc.

Any of these blocking agents is advantageously utilizable, provided that a reaction with the carboxyl group of the molecule of the polyester takes place to form a stable linkage. Among them, polyurethanes, carbodiimides and epoxy compounds are particularly preferred. The addition of the blocking agent is effected in a similar manner to the case of the said polyester mentioned above.

As understood from the above description, the object of the invention is to provide novel high strength polyester fibrous products for rubber-reinforcement having a reduced heat build-up in rubber and an improved durability without deterioration of the excellent properties inherent to polyester fiber for rubber-reinforcement. The polyester fibrous products of the invention are particularly useful as reinforcing materials for heavy duty tires such as those for trucks and buses.

The present invention will be hereinafter explained further in detail by the following Examples, wherein the melting point, the glass transition point, the temperature distribution of mechanical loss tangent, the dry thermal shrinkage of thermally treated yarn, the tube fatigue test and the intrinsic viscosity are determined by the following procedures:

Melting point: Using a differential scanning calorimeter DSC-1 B (manufactured by Perkin-Elmer Co., Ltd.), a specimen (10 mg) is heated under a temperature elevating rate of 20° C./min with a sensitivity of 8 m cal/sec in argon atmosphere, and the peak temperature of the thermal absorption peak due to melting of crystals is determined as the melting point.

Glass transition point: Using the same apparatus as in determination of the melting point, a specimen is heated under the same conditions, and the temperature at which thermal absorption due to glass transition is initiated is determined as the glass transition point.

Temperature distribution of mechanical loss tangent: Using a Rheo-vibron DDVIIC (manufactured by Toyo Baldwin Co., Ltd.), a specimen having a length of 4 cm is heated in the air with a temperature elevating rate of 1° C./min at a frequency of 110 Hz, and the mechanical loss tangent (tan $\delta$) is determined. From its temperature distribution, the peak temperture of the main absorption thought to be derived from the amorphous parts is obtained as $T\alpha$.

Dry thermal shrinkage of thermally treated yarn: A specimen having a length of 30 cm is charged with an initial load of 0.05 g/d and left for 30 minutes in the air of 150° C., and the shrinkage is determined.

Tube fatigue test: Using a tube fatigue tester (manufactured by Toray Engineering Co., Ltd.), a tube prepared according to JIS-L 1017 is tested under the following conditions: tube angle, 70°; rotation, 860 rpm, inverting every 30 minutes; air pressure, 1.0 kg/cm$^2$ (gauge pressure). The time required for attaining breakdown is recorded as the tube life. The tube surface temperature is measured by the use of a digital type thermoelectric thermometer at the tube portion having the maximum curvature after the equilibrium temperature is obtained. For measurement of the inner temperature of the tube, a thermocouple is inserted into the tube from the side of free rotation axis of the tube fatigue tester, and the temperature of the tube portion having the maximum curvature is measured by the use of a digital type thermoelectric thermometer after the equilibrium temperature is obtained.

Intrinsic viscosity: Determination is effected at 30° C. in a solvent mixture of phenol : tetrachloroethane (3:2 by weight).

EXAMPLE 1

To polyethylene terephthalate in a pellet form having an intrinsic viscosity of 1.0, prepared by polycondensation of terephthalic acid and ethylene glycol in a conventional procedure, polytetramethylene terephthalate (hereinafter referred to as "PBT") having a glass transition point of 25° C. and an intrinsic viscosity of 0.9, prepared by polycondensation of terephthalic acid and butylene glycol in a conventional procedure, was added in an amount of 2 mol %, 4 mol %, 8 mol % or 30 mol % (as the polymer constituting units), and the mixture was melted and subjected to melt spinning. The obtained as spun yarn was drawn in a draw ratio of 5.9 to produce a drawn yarn of 1500 d/190 f (green yarn).

Two of the green yarns were twisted so as to make a ply twist of 40 T/10 cm and a cable twist of 40 T/10 cm. The thus obtained greige cord having a twisting constant of 1549 was subjected to dip treatment (RFL treatment) in a conventional manner, and the tube fatigue test of the resulting dipped cord was carried out.

Onto the said green yarn, constant length heat treatment in the air of 240° C. for 2 minutes was applied, and the dry thermal shrinkage and the peak temperature ($T\alpha$) of the main absorption appearing in the temperature distribution of the mechanical loss tangent were measured.

The results are shown in Table 1, which the data obtained in case of not adding PBT (i.e. using polyethylene terephthalate alone) are also shown for comparision.

cific range of the invention, to the contrary, the lowering of the melting temperature is only 9.5° C., but the lowering of $T\alpha$ is larger than 20° C., and the mechanical properties desired for rubber-reinforcing fiber are markedly deteriorated, the practical use being thus impossible.

EXAMPLE 2

To polyethylene terephthalate having an intrinsic viscosity of 1.0 as used in Example 1, polyethylene isophthalate having a glass transition point of 51° C. and an intrinsic viscosity of 0.5, prepared by a conventional procedure, was added in an amount of 5 mol % (as the polymer constituting units), and the mixture was melted and subjected to a conventional melt spinning process. The obtained as spun yarn was drawn in a draw ratio of 5.9 to produce a drawn yarn of 1500 d/190 f (green yarn).

Two of the green yarns were twisted so as to make a ply twist of 40 T/10 cm and a cable twist of 40 T/10 cm. The thus obtained greige cord having a twisting constant of 1549 was subjected to dip treatment with RFL treating solution by a conventional procedure, and the tube fatigue test of the resulting dipped cord was carried out. The ratio of the methylene groups to the total terephthalic acid residues in the fiber was 2.1.

The said green yarn showed the following properties: strength, 12.0 kg; elongation, 12.3%; elongation under load of 6.8 kg, 6.8%; melting point, 258° C. The dry thermal shrinkage after the same thermal treatment as in Example 1 was 4.5%, and $T\alpha$ was 152° C. After the tube fatigue test, the tube surface temperature was 88.3° C. and the life was 847 minutes.

It is thus understood that, in the cord of this Example, the heat build-up is reduced and the durability is greatly improved, in comparision with the cord composed of polyethylene terephthalate alone (No. 1 in Example 1), without deterioration of the mechanical properties inherent to polyethylene terephthalate.

Table 1

| No. | Amount of of added PBT (mol %) | Ratio of methylene groups/ total terephthalic acid residues | Green yarn | | | | | Thermally treated yarn | | Tube fatigue test | |
|---|---|---|---|---|---|---|---|---|---|---|---|
| | | | Strength (kg) | Elongation (%) | Elongation under load of 6.8 kg (%) | Melting point (°C.) | Amount of carboxyl groups (eq/$10^6$ g) | Dry thermal shrinkage (%) | $T\alpha$ (°C.) | surface temperature (°C.) | Life (min) |
| 1 | 0 | 2.00 | 12.5 | 11.4 | 6.9 | 262 | 18 | 4.3 | 155 | 90.3 | 735 |
| 2 | 2 | 2.04 | 13.1 | 12.2 | 6.3 | 263 | 20 | 3.7 | 151 | 89.7 | 835 |
| 3 | 4 | 2.08 | 12.7 | 11.1 | 4.9 | 261 | 21 | 4.3 | 149 | 87.2 | 1123 |
| 4 | 8 | 2.16 | 12.0 | 12.4 | 6.0 | 257 | 24 | 3.3 | 140 | 83.8 | 1092 |
| 5 | 30 | 2.60 | 6.4 | 21.6 | — | 251.5 | — | 10.6 | 110 | — | — |

It is apparent from Table 1 that, in the cords (Nos. 2–4) composed of the polyester fiber obtained by melt spinning of a mixture of polyethylene terephthalate with PBT in such an amount as regulating the ratio of methylene groups/total terephthalic acid residues into a range of 2.0 to 2.5 and whose melting point and $T\alpha$ satisfy the specific conditions as defined in the present invention, the heat build-up (estimated by the surface temperature in the tube fatigue test) is reduced and the durability (estimated by the life in the tube fatigue test) is greatly improved, in comparision with the cord (No. 1) composed of polyethylene terephthalate alone, without deterioration of the excellent mechanical properties inherent to polyethylene terephthalate. In the cord (No. 5) in which the added amount of PBT exceeds the spe-

EXAMPLE 3

To polyethylene terephthalate having an intrinsic viscosity of 1.0 as used in Example 1, polytetramethylene terephthalate having a glass transition point of 25° C. and an intrinsic viscosity of 0.7 and polyurethane, prepared from ethylene glycol, tetramethylene glycol, adipic acid and 4,4'-methylenebis(phenylisocyanate), were added respectively in an amounts of 8 mol % (as the polymer constituting units) and of 0.5% by weight to polyethylene terephthalate, and the mixture was melted and subjected to a conventional melt spinning process. The obtained as spun yarn was drawn in a draw ratio of 5.9 to produce a drawn yarn of 1500 d/190 f (green yarn).

Then, the green yarns were subjected to twisting and dip treatment under the same conditions as in Example 1, and the tube fatigue test of the resulting dipped cord was carried out. The ratio of the methylene groups to the total terephthalic acid residues in the fiber was 2.16.

The said green yarn showed the following properties: strength, 12.2 kg; elongation, 13.0%; elongation under load of 6.8 kg, 5.9%; melting point, 256° C.; amount of carboxyl groups, 5 eq/10⁶ g. The dry thermal shrinkage after the same thermal treatment as in Example 1 was 3.8% and Tα was 139° C. After the tube fatigue test, the tube surface temperature was 84.0° C. and the life was 1356 minutes.

It is thus understood that, in the cord of this Example, the durability is further improved, in comparision with the cord (No. 4) in Example 1 which was prepared under the same conditions but not adding polyurethane. This is probably attributable to blockade of the carboxyl end groups in the fiber by the addition of polyurethane.

EXAMPLE 4

To polyethylene terephthalate having an intrinsic viscosity of 1.0 as shown in Example 1, polyethylene succinate having a glass transition point of −1.0° C. and an intrinsic viscosity of 0.4, prepared by a conventional procedure, as added in an amount of 2 mol % (as the polymer constituting units), and the mixture was melted and subjected to a conventional melt spinning process. The obtained as spun yarn was drawn in a draw ratio of 5.9 to produce a drawn yarn of 1500 d/190 f (green yarn).

Then, a greige cord was prepared from the green yarns as in Example 1, and a conventional dip treatment with RFL treating solution and a tube fatigue test were carried out. The ratio of the methylene groups to the total terephthalic acid residues in the fiber was 2.12. The said green yarn showed the following properties: strength, 12.0 kg; elongation, 12.3%; elongation under load of 6.8 kg, 7.0%; melting point, 254° C. The dry thermal shrinkage after the same thermal treatment as in Example 1 was 4.4% and Tα was 145° C. After the tube fatigue test, the tube surface temperature was 86.7° C. and the life was 989 minutes.

It is thus understood that, in the cord of this Example, the heat build-up is reduced and the durability is greatly improved, in comparison with the cord (No. 1) in Example 1, without deterioration of the mechanical properties inherent to polyethylene terephthalate.

EXAMPLE 5

To polyethylene terephthalate having an intrinsic viscosity of 1.0 as shown in Example 1, polytetramethylene terephthalate having a glass transition point of 25° C. and an intrinsic viscosity of 1.2 and di-o-tolylcarbodiimide were added respectively in amounts of 5 mol % (as the polymer constituting units) and of 0.05% by weight to polyethylene terephthalate, and the mixture was melted and subjected to a conventional melt spinning process. The obtained as spun yarn was drawn in a draw ratio of 5.9 to produce a drawn yarn of 1500 d/190 f (green yarn).

The green yarns were subjected to twisting and dip treatment under the same conditions as in Example 1, and the tube fatigue test of resulting dipped cord was carried out. The ratio of the methylene groups to the total terephthalic acid residues in the fiber was 2.1.

The said green yarn showed the following properties: strength, 13.0 kg; elongation, 11.7%; elongation under load of 6.8 kg, 6.2%; melting point, 258° C.; amount of carboxyl group, less than 1 eq/10⁶ g. The dry thermal shrinkage after the same thermal treatment as in Example 1 was 4.0% and Tα was 146° C. After the tube fatigue test, the tube surface temperature was 86.0° C. and the life was 1300 minutes.

Thus, in the cord of this Example, the durability is greatly improved in comparison with the cord (No. 1) in Example 1.

EXAMPLE 6

To polyethylene terephthalate having an intrinsic viscosity of 1.0 as shown in Example 1, polytetramethylene terephthalate having an intrinsic viscosity of 0.9 was added in an amount of 5 mol %, and the mixture was melted and subjected to melt spinning in a conventional manner. The obtained as spun yarn was drawn in a draw ratio of 6.0 to make a drawn yarn of 1500 d/190 f (green yarn).

Then, two pairs of the green yarns were twisted so as to make a ply twist of 40 T/10 cm and a cable twist of 40 T/10 cm or a ply twist of 30 T/10 cm and a cable twist of 30 T/10 cm. The thus obtained two kinds of greige cords having respectively twisting constants of 1549 and 1162 were subjected to dip treatment, and the tube fatigue test of the resulting dipped cords was carried out. The ratio of the methylene group to the total terephthalic acid residues in the fiber was 2.10.

The said green yarn showed the following properties: strength, 13.2 kg; elongation, 11.7%; elongation under load of 6.8 kg, 6.1%; melting point, 259° C.; amount of carboxyl groups, 20 eq/10⁶ g. The dry thermal shrinkage after the same thermal treatment as in Example 1 was 5.4% and Tα was 146° C. After the tube fatigue test, the inner temperature of the tube was 154° C. and the tube life was 288 minutes in case of the cord having a twist of 30/30. In case of the cord having a twist of 40/40, the inner temperature of the tube was 141.5° C. and the tube life was 1555 minutes.

On the other hand, the green yarn obtained under the same conditions as above but not adding polytetramethylene terephthalate showed the following properties: strength, 13.4 kg; elongation, 12.3%; elongation under load of 6.8 kg, 5.6%; melting point, 262° C., amount of carboxyl group, 18 eq/10⁶ g. The dry thermal shrinkage after the same thermal treatment as in Example 1 was 4.6% and Tα was 154° C. After the tube fatigue test, the inner temperature of the tube was 162.3° C. and the tube life was 180 minutes in case of the cord having a twist of 30/30. In case of the cord having a twist of 40/40, the inner temperature of tube was 148.5° C. and the tube life was 1013 minutes.

Thus, the addition of 5 mol % of PBT brings about marked effects in lowering the heat build-up temperature and in improving the durability.

EXAMPLE 7

To polyethyleneterephthalate having an intrinsic viscosity of 0.9 as shown in Example 1, copolymerized polyester in a pellet form having an intrinsic viscosity of 0.87, prepared by polycondensation of an acid component comprising terephthalic acid and isophthalic acid (9:1) with ethylene glycol, was added in an amount of 30% by weight, and the mixture was melted and subjected to melt spinning in a conventional manner. The obtained as spun yarn was drawn in a draw ratio of 5.8 to make a drawn yarn of 1000 d/190 f (green yarn).

Then, two of the green yarns were twisted so as to make a ply twist of 48 T/10 cm and a cable twist of 48 T/10 cm. The thus obtained greige cord with a twisting constant of 1518 was subjected to dip treatment with RFL treating solution by a conventional procedure, and the tube fatigue test of the resulting dipped cord was carried out. The ratio of the methylene groups to the total terephthalic acid residues in the fiber was 2.06.

The said green yarn showed the following properties: strength, 8.7 kg; elongation, 11.5%; elongation under load of 4.5 kg, 5.7%; melting point, 253° C.; amount of carboxyl groups, 23 eg/$10^6$ g. The dry thermal shrinkage after the same thermal treatment as in Example 1 was 3.7% and $T\alpha$ was 147° C. After the tube fatigue test, the inner temperature of the tube was 148° C. and the tube life was 1037 minutes.

On the other hand, the green yarn prepared under the same conditions as above but using polyethylene terephthalate having an intrinsic viscosity of 0.9 alone showed the following properties: strength, 8.9 kg; elongation, 11.9%; elongation under load of 4.5 kg, 5.6%; melting point, 261° C.; amount of carboxyl groups, 19 eq/$10^6$ g. The dry thermal shrinkage after the same thermal treatment as in Example 1 was 3.8% and $T\alpha$ was 153° C. After the tube fatigue test, the inner temperature of the tube was 157° C. and the tube life was 629 minutes.

What is claimed is:

1. A high strength polyester fibrous product reduced in heat build-up and improved in durability and useful for reinforcing rubber materials, which is prepared by twisting drawn yarns obtained by melt spinning a polymeric composition comprising polyethylene terephthalate as the main polymer component and at least one methylene group-containing polyester in such an amount that the proportion of the total number of methylene groups to the total number of terephthalic acid residues in all the polymer components is more than 2.0 and less than 2.5, the polyester having a glass transition temperature lower than that of the polyethylene terephthalate and being selected from the group consisting of (i) polyalkylene terephthalates wherein the aklylene unit is a straight chain having 3 to 8 carbon atoms, (ii) polyalkylene isophthalates wherein the alkylene unit is a straight chain having 2 to 6 carbon atoms and (iii) aliphatic polyesters wherein the number of the methylene groups between two ester linkages is from 2 to 10, and drawing the resulting as spun yarns, and having the following melting point (Tm):

$$Tm\ pet \geq Tm \geq Tm\ pet - 10°\ C.$$

(wherein Tm pet is the melting point of the polyethylene terephthalate) and the following peak temperature ($T\alpha$) of the main absorption appearing in the temperature distribution of the mechanical loss tangent when heat treated in the air at 240° C. for 2 minutes while keeping a constant length after the drawing:

$$T\alpha\ pet - 2°\ C. \geq T\alpha \geq T\alpha\ pet - 20°\ C.$$

(wherein $T\alpha$ pet is the peak temperature of the main absorption of the yarns made of polyethylene terephthalate alone drawn and heat treated under the same conditions as applied to the said as spun yarns made of the polymeric composition).

2. The fibrous product according to claim 1, wherein the polyethylene terephthalate has an intrinsic viscosity of not less than 0.7.

3. The fibrous product according to claim 1, wherein the polyester is polytetramethylene terephthalate.

4. The fibrous product according to claim 1, wherein the polyester is polyethylene isophthalate.

5. The fibrous product according to claim 1, wherein the drawn yarns have the following melting point (Tm):

$$Tm\ pet \geq Tm \geq Tm\ pet - 5°\ C.$$

6. The fibrous product according to claim 1, wherein the drawn yarns have the following peak temperature ($T\alpha$) of the main dispersion:

$$T\alpha\ pet - 5°\ C. \geq T\alpha \geq T\alpha\ pet - 15°\ C.$$

7. The fibrous product according to claim 1, wherein the fibrous product has a filament denier of not less than 4 d and a yarn denier of not less than 800 d.

8. The fibrous product according to claim 1, wherein the fibrous product is a multi ply cord having a twisting constant of 500 to 2500.

9. The fibrous product according to claim 1, wherein the polymeric composition comprises further at least one compound capable of blocking the coarboxyl end group in the polyethylene terephthalate and the polyester in such an amount that the carboxyl equivalent in all the polymer components is not more than 15 eq/$10^6$ g.

10. The fibrous product according to claim 9, wherein the compound is a polyurethane, a carbodiimide or an epoxy compound.

11. A rubber material reinforced by the use of the fibrous product according to claim 9.

12. A rubber material reinforced by the use of the fibrous product according to claim 1.

* * * * *